United States Patent [19]

Kelly et al.

[11] Patent Number: 4,548,652
[45] Date of Patent: Oct. 22, 1985

[54] METHOD OF PURGING A PLURAL COMPONENT MIXING AND DISPENSING SYSTEM

[75] Inventors: Lawrence S. Kelly, Bolingbrook; Marty P. McCormick, Palatine; William A. Weikel, Hanover Park, all of Ill.

[73] Assignee: Graco Inc., Minneapolis, Minn.

[21] Appl. No.: 674,942

[22] Filed: Nov. 26, 1984

Related U.S. Application Data

[62] Division of Ser. No. 529,346, Sep. 6, 1983, Pat. No. 4,522,789.

[51] Int. Cl.⁴ .................. B01F 5/05; B08B 9/02
[52] U.S. Cl. .................. 134/22.12; 134/22.11; 134/22.18; 134/34; 422/133; 422/135; 422/234
[58] Field of Search ............ 134/34, 36, 22.11, 22.12, 134/22.14, 22.18, 22.19; 422/132, 133, 135, 234; 239/112, 113, 127, 413, 427; 366/136, 137, 159, 173; 222/109; 261/DIG. 26; 521/917

[56] References Cited

U.S. PATENT DOCUMENTS

| | | |
|---|---|---|
| 1,566,596 | 12/1925 | Hardesty . |
| 1,851,338 | 3/1932 | Wemple . |
| 1,925,056 | 8/1933 | Pepper . |
| 2,123,604 | 7/1938 | Johnson . |
| 2,727,786 | 12/1955 | Bede . |
| 3,023,968 | 3/1962 | Mitchell . |
| 3,164,325 | 1/1965 | Veum . |
| 3,240,432 | 3/1966 | Boettler . |
| 3,246,845 | 4/1966 | Techler . |
| 3,829,016 | 8/1974 | Schartenberger . |
| 4,037,758 | 7/1977 | Bourque . |
| 4,073,664 | 2/1978 | Zwirlein ............... 134/34 |
| 4,106,699 | 8/1978 | Holt . |
| 4,138,161 | 2/1979 | Payre . |
| 4,204,977 | 5/1980 | Zwirlein ............... 134/34 |

Primary Examiner—Barry S. Richman
Assistant Examiner—W. R. Johnson
Attorney, Agent, or Firm—Paul L. Sjoquist

[57] ABSTRACT

A system and method of operating for mixing and dispensing two liquid components, characterized in that each component is chemically stable when maintained in isolation and chemically reactive when combined with the other component. The system includes separate liquid storage containers and pumps for delivering each of the liquids through a common mixing manifold, and from there to a dispensing apparatus, the system including a further pump in one of the containers for delivering liquid through a valved, closed loop subsystem back to the container, the closed loop having therein an entry point for connection to the dispensing apparatus, and the system including a further valve for controlling the flow of the other liquid component to the dispensing apparatus, whereby the conduits leading to the dispensing apparatus may be purged of mixed liquid components, diluted, and returned to the one storage container.

3 Claims, 1 Drawing Figure

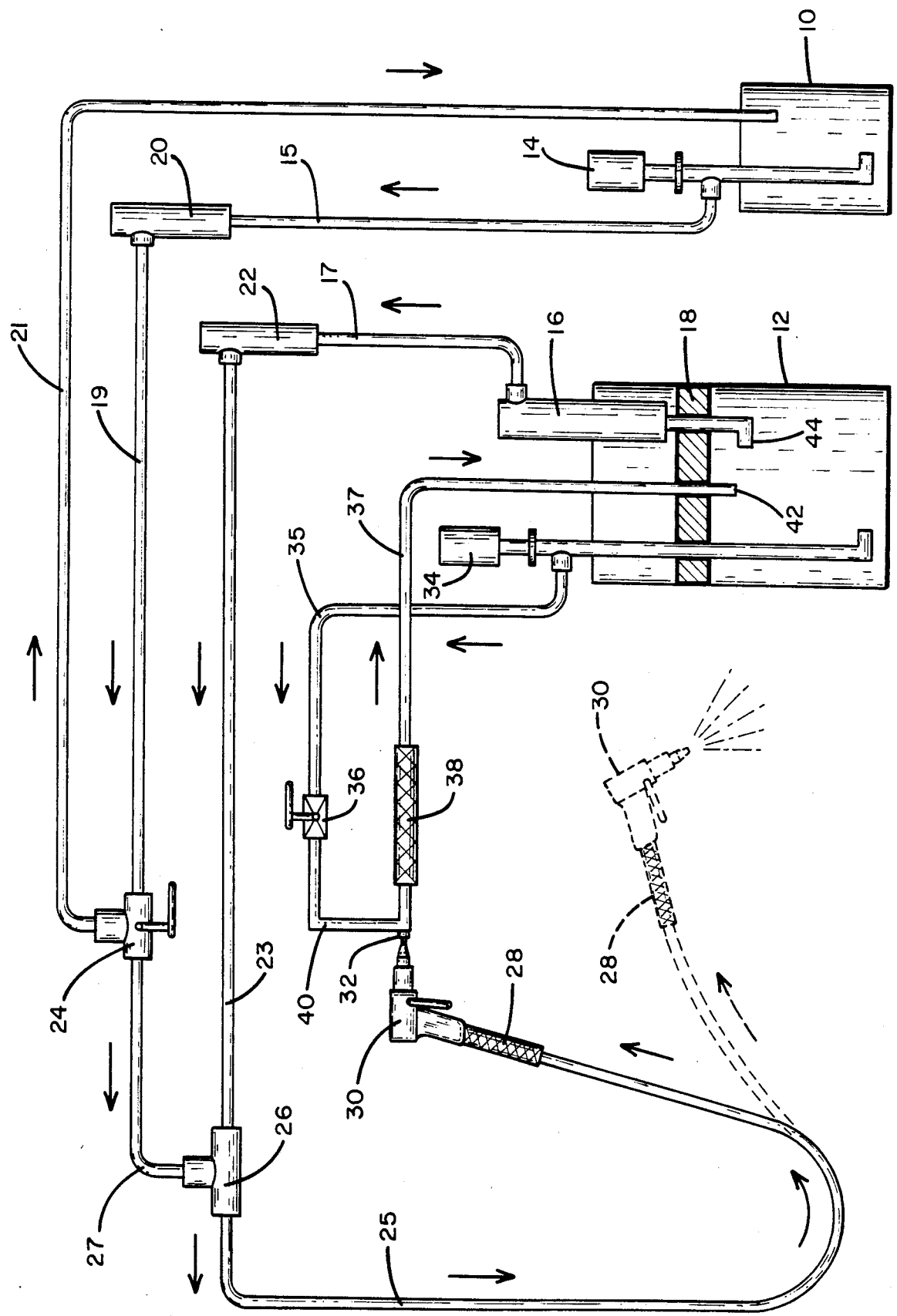

METHOD OF PURGING A PLURAL COMPONENT MIXING AND DISPENSING SYSTEM

This application is a division of U.S. patent application Ser. No. 529,346, filed Sept. 6, 1983 now U.S. Pat. No. 4,522,789 issued June 11, 1985.

BACKGROUND OF THE INVENTION

The present invention relates to plural component mixing and dispensing systems, and more paticularly to a system and method of operation for producing zero waste of the liquid components fed to the system.

Plural component liquids are typically liquids which are chemically inert in their respective individual states, and chemically reactive when brought together and mixed to form a composite liquid mixture. In the chemically active state, such mixed liquids, commonly comprising a resin component and a catalyst component, are characterized in that they require only a short time interval to become "set" or to solidify. Once such liquids have become solidified they are capable of providing advantageous coatings in the coating materials field, or other advantageous chemical and physical behavior in other fields, depending upon the nature and type of materials being used. For example, such materials are used to provide extremely durable finishes on metals and other materials, they are also used to provide foam insulation for construction projects, and they are also used to provide unique filling and packing materials for furniture, packaging, and other purposes. Because such materials are chemically active when mixed together, they do present a significant problem in handling, particularly when they are utilized in a system which requires intermittent application. Once the materials become mixed together, they must be specially handled during the limited time in which they remain in a relatively fluid state, for once they solidify it is practically impossible to return them to a liquid or fluid state.

In systems for mixing and dispensing such materials, it has been a continual problem to provide application procedures and equipment which do not waste at least some material, particularly during intermittent dispensing operations. The mixing of the two materials must occur prior to the point where they are dispensed, and after the dispensing operation is completed there is therefore always some quantity of mixed material remaining in the dispensing mechanism which must be disposed of. In most cases this material is purged from the system into a waste collector by utilizing solvents as a purging and cleaning solution. This necessitates the need for waste collection containers, and requires that suitable storage and disposal procedures be adopted.

It has been found, that for at least certain types of resin and catalyst components, the setting time for conversion of mixed components into solids is a direct function of the mix ratio of these components. It has been found further that the ratio can be diluted to such an extent to retard the setting time to a time interval considerably longer than the intermittent "off" time of the system when used in such intermittent applications. For example, in a typical plant environment, such application systems may be utilized relatively continuously during the work day, but may then be unused during one or several work shifts when the plant is either closed down, or when other operations are performed not requiring the dispensing of these components. Formerly, this situation would require that the system be completely purged of mixed components and thoroughly cleaned before shutdown, and at the time the system is restarted the system would be again refilled with properly mixed materials to enable the start up of a new dispensing operation.

SUMMARY OF THE INVENTION

The invention comprises a catalyst pumping and delivery system, coupled through a two-way valve to a mixing manifold, and including the capability of providing a recirculation connection from the two-way valve back to the catalyst container. The system further comprises a resin container and pumping system for delivering resin material to the mixing manifold, and a conduit for delivering the mixed material to a dispensing device. The system further comprises a second pumping and delivery system coupled to the resin container for delivering resin through a valve and a closed recirculation loop back to the resin container, the recirculation loop having a connection point for coupling the dispensing device directly into the recirculation loop.

The method of the present invention comprises the steps of sequentially opening and closing the respective valves, and actuating the dispensing device, for recirculating the catalyst material to its container during shutdown, while simultaneously actuating both the resin pumping and delivery system and the resin secondary pump and recirculating system for purging the mixed components in the delivery lines back to the resin tank, under heavy dilution by the addition of additional resin material.

It is therefore a principal object of the invention to provide a mixing and dispensing system having a mixed material purge cycle which yields no waste material.

It is another object of the present invention to provide a mixing and dispensing system whereby start up procedures enable the complete filling of all of the lines leading to the dispensing device without wasting any material.

It is yet another object of the present invention to provide a system for sufficiently diluting the relative mix of catalyst and resin to extend the thermosetting time to an interval longer than the downtime of the system between dispensing operations. These and other objects and advantages of the invention will become apparent from the following specification and claims, and with reference to the appended drawing.

BRIEF DESCRIPTION OF THE DRAWING

The invention is illustrated on the single drawing, which shows a symbolic diagram of a preferred embodiment.

DESCRIPTION OF THE PREFERRED EMBODIMENT

Referring to the drawing, there is shown a catalyst tank 10 and a resin tank 12. Each of these tanks is of sufficient size to hold quantities of the respective catalyst and resin material to enable dispensing over a considerable length of time, as for example one or two weeks. The catalyst material in tank 10 is chemically inert while it remains in tank 10, and for so long as it is pumped through lines which do not bring it into contact with the resin material. Similarly, the resin material in tank 12 is chemically inert and remains inert for so long as the material resides in tank 12, or is pumped over lines which do not bring it into contact with the catalyst material. When such resin and catalyst materials are brought into contact with one another, a time varying chemical reaction takes place which ultimately tends to solidify the materials. The length of time required for this solidifying reaction is dependent upon a number of factors, including the type and nature of the materials themselves, the particular volume ratio of the resultant mixed material, temperature, and other factors. For example, it has been found that polysulfide insulating glass sealant material is preferably mixed to a ratio of 10:1 (resin/catalyst), and when mixed to this ratio the chemical reaction which takes places results in setting of the material into a relative solid in less than ten minutes. As the ratio of this mixed material is varied, the thermosetting time also varies, and sufficiently high ratios can be formulated which will prevent thermosetting reaction from taking place at all. As an example, it has been found that polysulfide insulating glass sealant material, when mixed to a ratio exceeding 90:1, will not set up at all and become a solid material. Other two-component mixtures have similar characteristics, although the so-called "critical" ratio above which solidifying does not take place may vary from material to material.

Catalyst tank 10 has a pump 14 coupled thereto, for delivering catalyst material via pump output line 15. Pump 14 is a standard commercially available pump, and may for example be a pump sold under the trademark MONARK by the assignee of the present invention. Such a pump is typically driven by a reciprocable air motor to deliver material at various predetermined pressures. Pump output line 15 is preferably connected to a heater 20, which may be any of a number of commercially available heaters for this purpose. A catalyst feed line 19 is connected to the output of heater 20 and delivers catalyst material to a two-way valve 24. Two-way valve 24 has a catalyst recirculation line 21 connected thereto, line 21 returning to catalyst tank 10. Two-way valve 24 also has a feed line 27 connecting it to a mixing manifold 26.

Resin tank 12 has a pump 16 coupled thereto, pump 16 having an intake port 44 which is submersible into the resin material within tank 12. A compression plate 18 is typically used in such resin pumping applications, compression plate 18 providing a downwardly acting compression force against the resin material in tank 18 to assist in the delivery of resin material into intake port 44. Pump 16 may be any of a number of commercially available pumps, as for example a pump sold under the trademark BULLDOG which is manufactured by the assignee of the present invention. Pump 16 has an output line 17 coupled to a heater 22, which may be selected from commercially available models for this purpose. A resin feed line 23 couples heater 22 to mixing manifold 26.

A delivery line 25 is coupled to the output of mixing manifild 26, and is also connected to a mixer 28. Mixer 28 is a commercially available component, and it is constructed so as to impede and agitate the flow of material therethrough so as to thoroughly mix the material into a unified mixture. Mixture 28 is connected to dispensing device 30, which may be a spray gun or other applicator available in the marketplace. Dispensing device 30 has a dispensing outlet which delivers the mixed resin and catalyst material in the form of a spray, bead, or other usable form.

In the figure, dispensing device 30 is shown in solid outline in position for purging material during shutdown or filling during start up, and is shown in dotted outline in a position for application usage.

Resin tank 12 also has a secondary resin pump 34 coupled thereto, of a type which is commercially available. For example, secondary resin pump 34 may be a type sold by the assignee of the present invention under the trademark designation MONARK pump. Secondary resin pump 34 has a pump output line 35 connected to an on-off valve 36. On-off valve 36 is coupled to a manifold 40, which in turn is connected to a mixer 38. Mixer 38 is of a type described previously, and functions to thoroughly mix the material flowing therethrough into a uniform composition. Mixer 38 is connected to secondary pump return line 37, which passes through a port 42 in the compression plate 18. The end of return line 37 is physically positioned relatively near to intake port 44 for reasons which will be hereinafter described.

Manifold 40 has a fitting 32 attached thereto. Fitting 32 is typically a spring-loaded ball check valve, and may be a commonly available grease fitting of the type used for applying grease into various moving parts. Fitting 32 serves as a one-way valve into manifold 40, and is sized to sealably fit against the output nozzle of dispensing device 30. Fitting 32 permits the flow of liquid into manifold 40 from an external device such as dispensing device 30, but does not permit the reverse flow of liquid from manifold 40 to the exterior.

In operation, dispensing device 30 is normally disconnected from fitting 32 during dispensing applications, as shown in dotted outline in the figure. Valve 24 is set to permit catalyst material to flow from catalyst tank 10 into the mixing manifold 26. Similarly, resin material flows from tank 12 into mixing manifold 26, and the two liquid components are combined and flow together through delivery line 25 to mixer 28. As the combined materials flow through mixer 28 they become thoroughly mixed and are dispensed by dispensing device 30 in that form.

If the system is to be shut down, valve 24 is adjusted to recirculate catalyst material from line 19 to line 21 and back to catalyst tank 10, and no material is permitted to flow through feed line 27. Simultaneously, valve 36 is opened to permit the recirculating flow of resin material from pump 34 through line 35, manifold 40, mixer 38 and back to the resin tank 12 via return line 37. Dispensing device 30 is sealably coupled against fitting 32 and is actuated to permit the flow of material through delivery line 25. Initially, this material comprises the mixed volume of catalyst and resin remaining in the line from the previous dispensing operation, but as pumping continues delivery line 25 fills with pure resin material via line 23, and the mixed resin/catalyst material is pushed from the line, through mixer 28 and dispensing device 30 and fitting 32 into manifold 40. At the same time, additional resin material is recirculated through manifold 40 and this additional resin material is mixed with the previously mixed resin/catalyst material in mixer 38, resulting in a heavily diluted ratio in favor of resin being passed back to the resin tank 12 via return line 37. The delivery rates of the respective materials are adjusted so as to provide a ratio of resin/catalyst in excess of 90:1 through the return line 37 back to tank 12. This phase of the pumping operation is permitted to continue until pure resin material is ejected from dispensing device 30 into manifold 40, at which time it is discontinued. At this point, delivery line 25, mixer 28, and dispensing device 30 are completely filled with pure resin material and no catalyst material.

If the system has been shut down and is to be restarted, it is necessary to purge delivery line 25, mixer 28 and dispenser 30 of the pure resin material previously loaded into these components, and to fill all of these components with mixed two-component resin and catalyst material according to the proper ratio. This is accomplished by setting valve 24 to permit catalyst material to enter mixing manifold 26, and simultaneously actuating pump 16 to provide resin material to mixing manifold 26. As the resin and catalyst material enters feed line 25 it forces ahead of it the pure resin material previously stored therein, and this material is passed into manifold 40 by application of applicator 30. During this time period, pump 34 is permitted to continue delivering resin material around the recirculation loop including manifold 40. This operation proceeds for a predetermined time, or until the mixed resin and catalyst material is seen to exit applicator 30 into fitting 32, whereby applicator 30 is removed from contact with fitting 32 and is ready for use. The recirculation material through manifold 40 is continued briefly, in order that any mixed resin/catalyst material which may have been injected into manifold 40 is thoroughly diluted and returned to tank 12.

All of the resin and diluted resin/catalyst which is recirculated via manifold 40 and return line 37 passes through a port 42 in compression plate 18. The end of line 37 is physically positioned close to pump intake port 44. Therefore, any material which is recirculated through manifold 40 is ultimately pumped back into tank 12, but physically placed in a position so as to be repumped by pump 16 as soon as the system resumes its operation. Dilute mixtures of resin and catalyst accumulate in the vicinity of intake port 44, and these mixtures are the first quantities of material to be moved out of tank 12 when normal operation resumes. It should be noted that when normal operation resumes, i.e., applicator dispenser 30 is applying the properly mixed components, pump 34 is shut off and no fluid is recirculated through the manifold 40.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of purging two mixed liquid components from a dispensing device and feed line, comprising the steps of
   (a) shutting off one of said liquid components while permitting said other liquid component to flow into said feed line; and
   (b) developing a separate, recirculating flow loop of said other liquid component, and
   (c) injecting the residual mixed liquid output stream from said dispensing device into said recirculating flow loop until said one of said liquid components is purged from said feed line and dispensing device.

2. A method of purging a resin and catalyst delivery and application system having a resin source and a catalyst source and means for separately pumping from each of said sources through respective conduits to a common mixing point and from there to a dispensing device, comprising the steps of:
   (a) stopping the pumping of said catalyst to said mixing point;
   (b) continuing the pumping of said resin to said mixing point;
   (c) further pumping said resin from said resin source through a third conduit which recirculates said resin back to said resin source; and
   (d) actuating the dispensing device so as to discharge into said third conduit, wherein the steps of continuing the pumping of said resin, further pumping said resin and actuating said dispensing device are continued until the material discharged by said dispensing device is substantially entirely resin material.

3. The method of claim 1, further comprising the step of discharging the output of said third conduit into said resin source near the point of pumping said resin from said resin source.

* * * * *

UNITED STATES PATENT AND TRADEMARK OFFICE
CERTIFICATE OF CORRECTION

PATENT NO. : 4,548,652

DATED : October 22, 1985

INVENTOR(S) : Lawrence S. Kelly, Marty P. McCormick and William A. Weikel

It is certified that error appears in the above-identified patent and that said Letters Patent is hereby corrected as shown below:

Claim 2, column 6, line 30, after "pumping" insert -- of --.

Claim 3, column 6, line 40, "1" should be -- 2 --.

Signed and Sealed this

Twenty-first Day of January 1986

[SEAL]

Attest:

DONALD J. QUIGG

Attesting Officer

Commissioner of Patents and Trademarks